(12) United States Patent
Ballantine et al.

(10) Patent No.: US 6,498,462 B2
(45) Date of Patent: Dec. 24, 2002

(54) GENERATOR CONTROL SYSTEM TO ACCOMMODATE A DECREASE IN A POWER GRID VOLTAGE

(75) Inventors: Arne W. Ballantine, Round Lake, NY (US); Mark R. Torpey, Saratoga Springs, NY (US)

(73) Assignee: Plug Power Inc., Latham, NY (US)

(*) Notice: Subject to any disclaimer, the term of this patent is extended or adjusted under 35 U.S.C. 154(b) by 23 days.

(21) Appl. No.: 09/777,156

(22) Filed: Feb. 5, 2001

(65) Prior Publication Data

US 2002/0105306 A1 Aug. 8, 2002

(51) Int. Cl.[7] .............................. H02P 9/04; H02J 3/00
(52) U.S. Cl. ........................ 322/8; 322/20; 290/40 B; 307/85
(58) Field of Search ........................ 322/20, 7, 8, 29; 290/1 R, 40 B; 307/85, 86, 87

(56) References Cited

U.S. PATENT DOCUMENTS

| | | | | |
|---|---|---|---|---|
| 4,347,575 A | * | 8/1982 | Gurr et al. ................... | 307/35 |
| 5,949,153 A | * | 9/1999 | Tison et al. .................. | 307/18 |
| 5,973,481 A | * | 10/1999 | Thompson et al. ........... | 290/2 |
| 6,191,500 B1 | * | 2/2001 | Toy ............................. | 307/64 |
| 6,281,601 B1 | * | 8/2001 | Edelman et al. ............. | 290/52 |
| 6,316,918 B1 | * | 11/2001 | Underwood et al. ......... | 307/87 |

* cited by examiner

*Primary Examiner*—Nicholas Ponomarenko
(74) *Attorney, Agent, or Firm*—Trop, Pruner & Hu, P.C.

(57) ABSTRACT

A system includes a generator and a circuit. The generator is coupled to provide power to a power grid. The circuit is coupled to the generator and is adapted to use a scheme to detect a shut down of the power grid and prevent the generator from providing power to the power grid in response to the detection of the shut down of the power grid. The circuit is also adapted to receive an indication to modify the scheme and modify the scheme based on the indication.

25 Claims, 5 Drawing Sheets

GENERATOR CONTROL SYSTEM TO ACCOMMODATE A DECREASE IN A POWER GRID VOLTAGE

BACKGROUND

The invention generally relates to a generator control system to accommodate a decrease in a power grid voltage.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

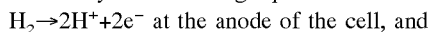

$H_2 \rightarrow 2H^+ + 2e^-$ at the anode of the cell, and

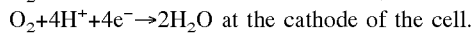

$O_2 + 4H^+ + 4e^- \rightarrow 2H_2O$ at the cathode of the cell.

A typical fuel cell has a terminal voltage near one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may determine the appropriate power that the stack needs to supply, and based on this determination, the controller estimates the fuel flow to satisfy the appropriate stoichiometric ratios to produce this power. In this manner, the controller regulates the fuel processor to produce this flow, and in response to the controller determining that a change in the output power is needed, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. If the fuel cell system is producing more power than is being consumed by the load, then the fuel cell system may provide power to a power grid.

More than one fuel cell system may be connected to the power grid and thus, it is possible that many fuel cell systems may be furnishing power to the power grid. For safety reasons, the fuel cell systems may be designed to shut down or at least disconnect from the power grid when the main utility that supplies power to the power grid shuts down. This scheme permits servicing of the power grid when the main utility shuts down by ensuring that all sources of power to the grid are removed from the grid.

For purposes of detecting when the main utility shuts down, a particular fuel cell system may monitor the voltage on the grid. In this manner, when the grid voltage decreases below some predefined threshold voltage, the fuel cell system may shut down in response to detecting this decrease. It is possible that the utility may lower the grid voltage when the overall load on the grid approaches the capacity of the grid. Such a lowering of the grid voltage, however, may cause the fuel cell systems to shut down, as the voltage drop may inadvertently indicate a shut down of the main utility to these fuel cell systems.

Thus, there is a continuing need for an arrangement and/or technique to address one or more of the problems that are stated above.

SUMMARY

In an embodiment of the invention, a technique includes coupling a generator to a power grid to provide power to the power grid. A scheme is used to detect a shut down of the power grid, and the generator is prevented from providing power to the power grid in response to the detection of the shut down of the power grid. An indication is received to modify the scheme, and the scheme is modified based on the indication.

Advantages and other features of the invention will become apparent from the following description, from the drawing and from the claims.

DETAILED DESCRIPTION

Figure 1:
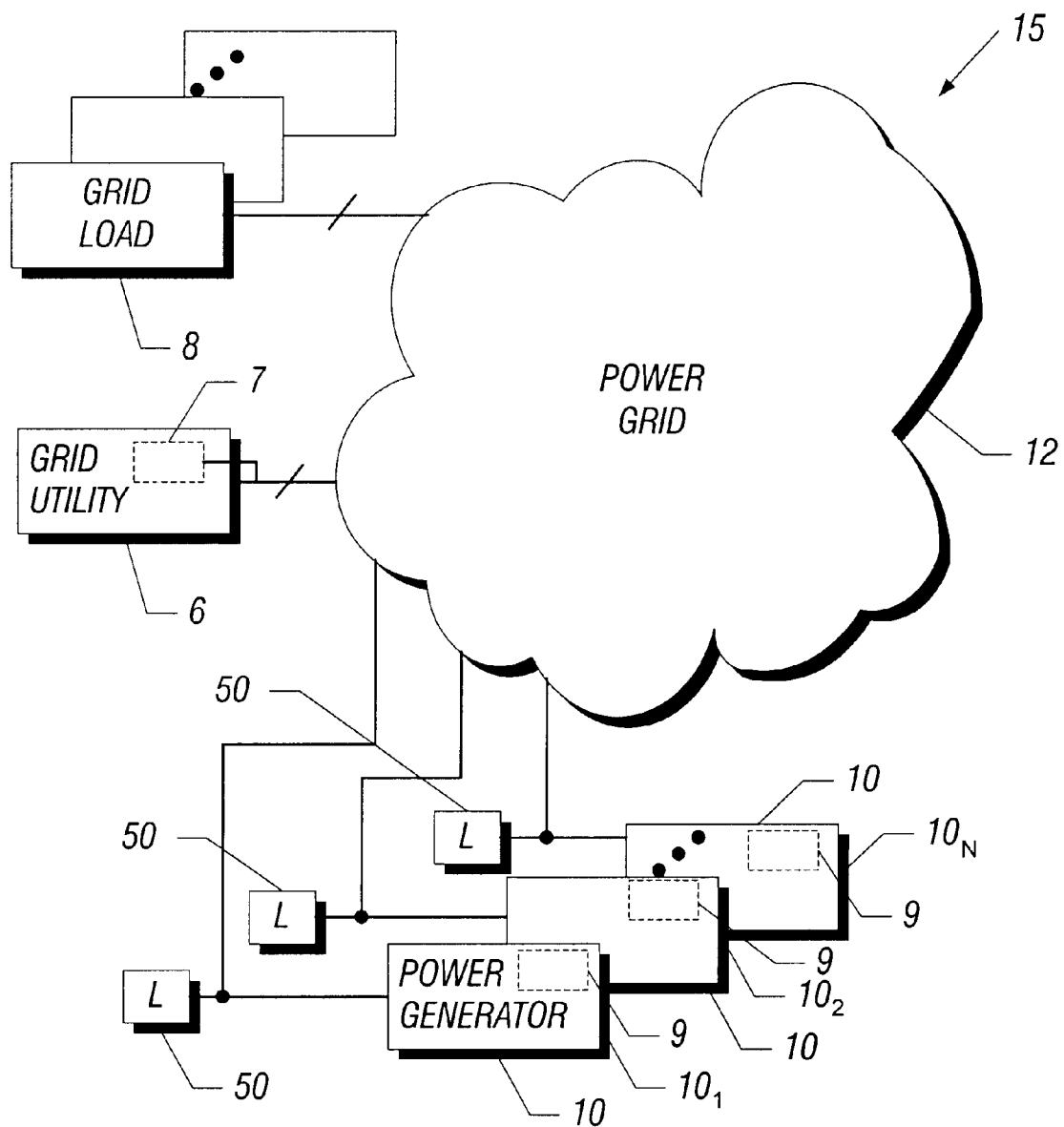
FIG. 1 is a schematic diagram of a power distribution system according to an embodiment of the invention.

Referring to FIG. 1, an embodiment 15 of a power distribution system in accordance with the invention includes a power grid 12 that communicates power to grid loads 8. As an example, the grid loads 8 may include various industrial and residential power consuming devices, such as air conditioning units, electrical motors, lights, appliances, etc. A grid utility 6 provides the main source of power for the power grid 12. The grid utility 6 may be formed from one or more power plants (hydroelectric power plants, for example) that may be located at various locations and controlled as a group to provide power to the power grid 12. The power grid 12 may also receive power from one or more power generators 10 (power generators $10_1$, $10_2$, . . . $10_N$ shown, as examples). Besides providing power to the power grid 12, each generator 10 may also provide power for an associated load 50. As an example, a particular power generator 10 may be a fuel cell system that provides power to residential electrical loads that collectively form the associated load 50.

On occasion, the utility 6 may shut down its power production the power grid 12 (called "shutting down the power grid 12," herein) for such purposes of permitting repairs to be performed on the power grid or on the utility 6, for example. It is noted that although the utility 6 may provide power to a larger grid, the power grid 12 refers to the portion of the grid that receives power from the one or more power generators 10.

For purposes of providing safe access to the power grid 12, all power must be removed from the power grid 12 when the utility 6 shuts down the grid 12. Therefore, each generator 10 is designed to detect power grid shut down, and in response to this detection, the generator 10 takes the appropriate action, such as disconnecting itself from the power grid 12 and/or shutting itself down.

As an example, a particular power generator 10 may detect shut down of the power grid 12 by monitoring a grid voltage of the power grid 12. In this manner, because the utility 6 is the dominant source of power for the power grid 12, the utility 6 establishes the grid voltage. Therefore, when the utility 6 shuts down its power production, the grid voltage drops. Thus, each power generator 10 may attempt to detect the shut down by monitoring the grid voltage.

However, the grid voltage may decrease for reasons other than a shut down of the power grid 12 by the utility 6. Therefore, it is possible that the generators 10 may incorrectly detect a shut down, if not for the technique that is described herein. As an example of one such other reason for a decrease in the grid voltage (other than a shut down of the power grid 12), when the total power that is consumed from the power grid 12 approaches the power that is being provided to the grid 12, the utility 6 may intentionally decrease the grid voltage (by three to five percent, for example). As described below, in some embodiments of the invention, to prevent the generators 10 from shutting down due to this decrease, the utility 6 communicates an indication of the impending decrease to the power generators 10. As a result of this communication, the generators 10 do not shut down due to this decrease.

To achieve this communication, in some embodiments of the invention, the grid utility 6 includes a transmitter 7 to transmit a signal to the power grid 12 to indicate the impending decrease in the grid voltage. In this manner, each generator 10 may include a receiver 9 to receive the communicated signal, and the generator 10 modifies its scheme for detecting the power grid shut down when the signal is received so that the generator 10 does not shut down due to the decrease. Depending on the particular embodiment of the invention, the signal may be an amplitude modulated (AM), phase modulated or frequency modulated (FM) signal, as just a few examples.

Regardless of the form of the signal, the signal indicates an impending change in the grid voltage, and in response to the indicated change, the generator 10 modifies the scheme that the generator 10 uses to detect a shut down of the power grid 12. In some embodiments of the invention, the utility 6 may communicate the signal to the power generators 10 via a medium (a telephone line, a separate wire or a wireless link, as examples) other than the power grid 12. The signal may indicate the magnitude of the decrease, in some embodiments of the invention. In other embodiments of the invention, the signal may indicate the same amount of voltage decrease. Therefore, for these embodiments, the utility 6 may transmit the appropriate number of signals to indicate the impending decrease. Other variations are possible.

It is noted that the utility 6 may indicate an impending change other than a decrease in the grid voltage. For example, the utility 6 may indicate an impending increase in the grid voltage using one or more signals.

Figure 2:
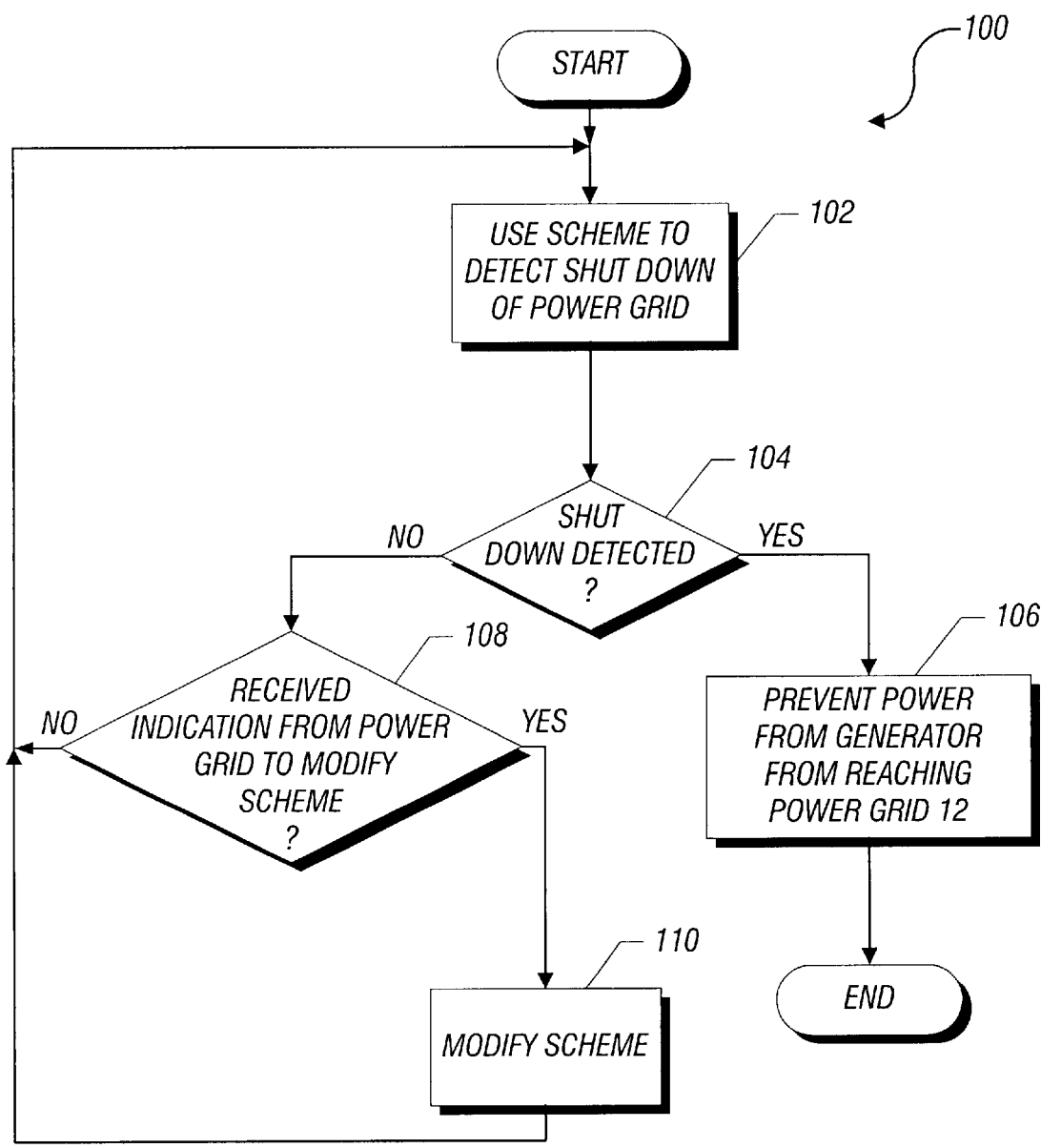
FIGS. 2 and 4 are flow diagrams depicting operation of the fuel cell system according to embodiments of the invention.

Thus, in general, each generator 10 uses a technique 100 that is depicted in FIG. 2. In the technique 100, the generator 10 uses a scheme to detect shut down of the power grid 12, as depicted in block 102. As an example of one possible scheme, the generator 10 may compare the grid voltage to a predetermined threshold voltage (a voltage that is set approximately five percent below the nominal grid voltage). In this manner, a shut down of the power grid 12 is detected when the grid voltage decreases below this threshold voltage.

Regardless of the scheme that is used, if the generator 10 determines (diamond 104) that the grid 12 has been shut down, then the generator 10 prevents power from the generator 10 from reaching the grid 12, as depicted in block 106, and then, the generator 10 terminates the technique 100 until the generator 10 once again provides power to the power grid 12. Otherwise, the generator 10 determines (diamond 108) whether an indication (via the signal) has been received from the power grid 12 to instruct the generator 10 to modify its shut down detection scheme. If so, the generator 10 modifies its detection scheme accordingly, as depicted in block 110. For example, if the generator 10 receives an indication that the utility 6 is going to decrease the grid voltage, then the generator 10 may decrease a threshold voltage that the generator 10 uses to detect shut down of the power grid 12. Control returns from block 110 to block 102.

Figure 3:
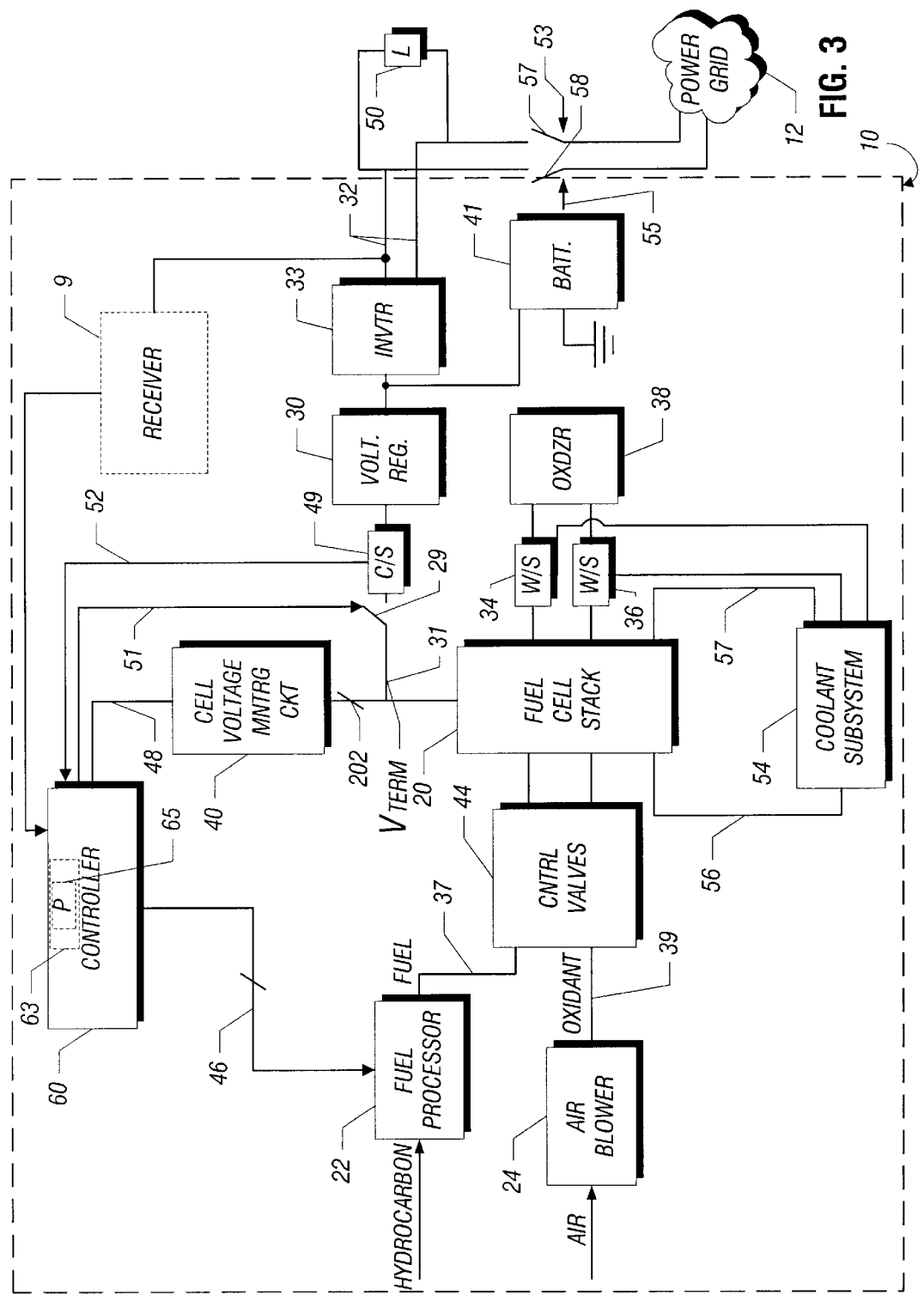
FIG. 3 is a schematic diagram of a fuel cell system according to an embodiment of the invention.

Referring to FIG. 3, in some embodiments of the invention, the generator 10 may be fuel cell system that includes a fuel cell stack 20 that is capable of producing power for an associated local load 50 (a residential load, for example); parasitic elements (valves, fans, etc.) of the system 10; and the power grid 12 when the switches 57 and 58 are closed) in response to fuel and oxidant flows that are provided by a fuel processor 22 and an air blower 24, respectively. In this manner, the fuel cell system 10 controls the fuel production of the fuel processor 22 to control the fuel flow that the processor 22 provides to the fuel cell stack 20. This rate of fuel flow to the fuel cell stack 20, in turn, controls the level of power that is produced by the stack 20.

The fuel cell system 10 includes AC output terminals 32 that are coupled to the load 50 and are coupled to the power grid 12 via the switches 57 and 58. Due to this arrangement, when the fuel cell system 10 detects a shut down of the power grid 12, the system 10 opens the switches 57 and 58 to isolate the output terminals 32 from the power grid 12 and thus, prevent power from flowing from the system 10 to the grid 12. Otherwise, to provide power to the power grid 12, the fuel cell system 10 closes the switches 57 and 58.

In some embodiments of the invention, the fuel cell system 10 includes a controller 60 to implement a shut down scheme and modify the scheme in accordance with indications that are received from the power grid 12. More specifically, in some embodiments of the invention, the fuel cell system 10 includes the receiver 9 that is coupled to the power grid 12 (when the switches 57 and 58 are closed) and provides an indication to the controller 60 of any changes to be made to the shut down detection scheme based on signals that are received from the grid 12. Pursuant to its shut down detection scheme, if the controller 60 determines that the fuel cell system 10 needs to be isolated from the power grid 12, the controller 60 opens the switches 57 and 58 (via control lines 53 and 55, respectively). Due to the decrease in load to the fuel cell system 10, the controller 60 may also control the fuel processor 22 (via control lines 46) to decrease the fuel production from the processor 22.

Figure 4:
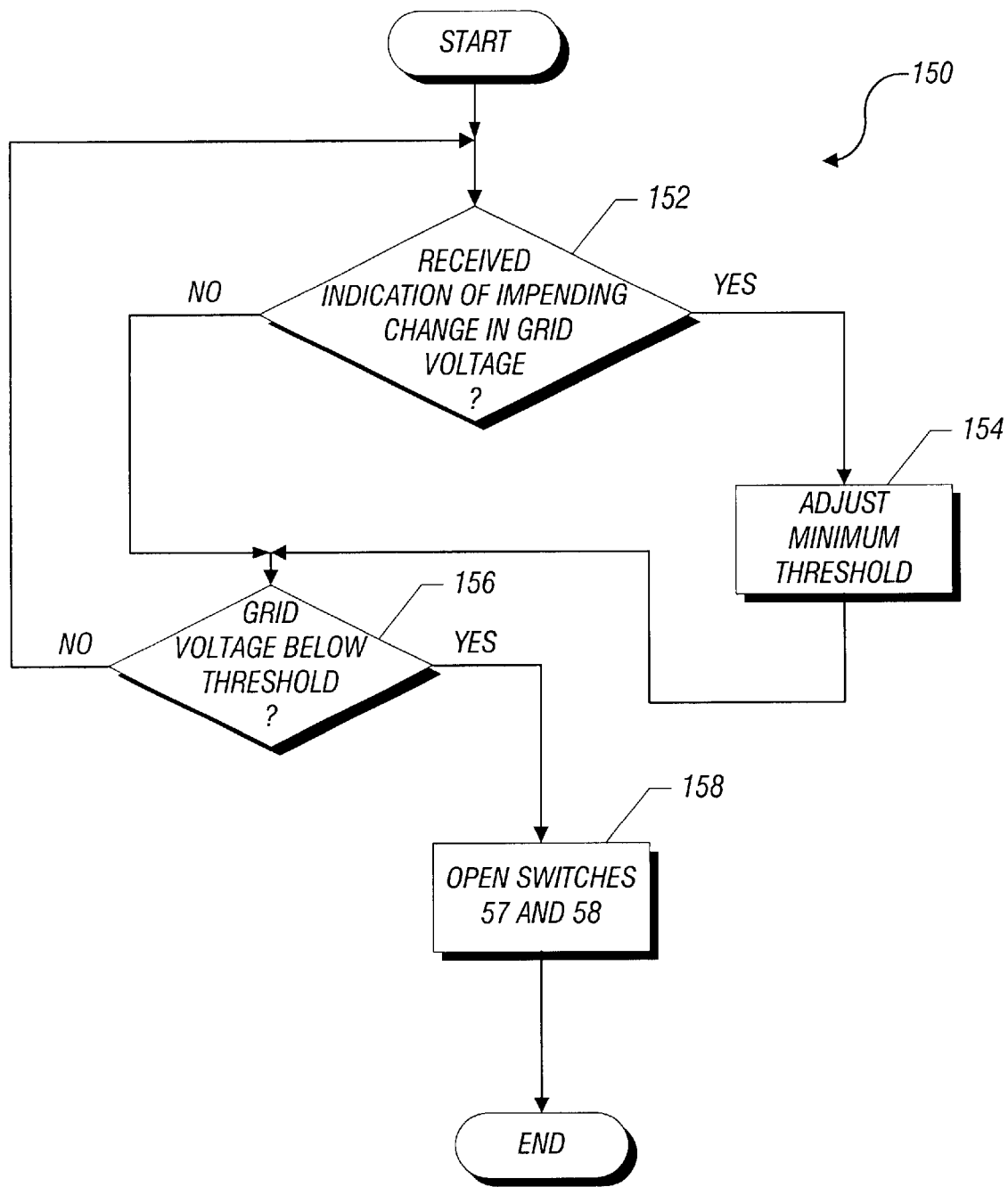

Referring also to FIG. 4, the controller 60 may execute a program 65 (stored in a memory 63 of the controller 60) to perform a technique 150 to implement the shut down detection scheme and modify the scheme based on signals that are received from the power grid 12. In the shut down detection scheme described below, it is assumed that the scheme includes comparing the grid voltage to a predetermined threshold voltage to detect shut down of the power grid 12. However, other shut down detection schemes are possible.

In the technique 150, the controller 60 determines (diamond 152) whether the fuel cell system 10 has received an indication of an impending change in the grid voltage. If so, the controller 60 adjusts (block 154) the minimum threshold voltage that is used in the shut down detection scheme. Otherwise, the controller 60 does not change this threshold voltage.

Next, the controller 60 determines (diamond 156) whether the grid voltage is below the minimum threshold voltage. If so, the controller 60 opens the switches 57 and 58, as depicted in block 158. Otherwise, control returns to diamond 152.

Figure 5:
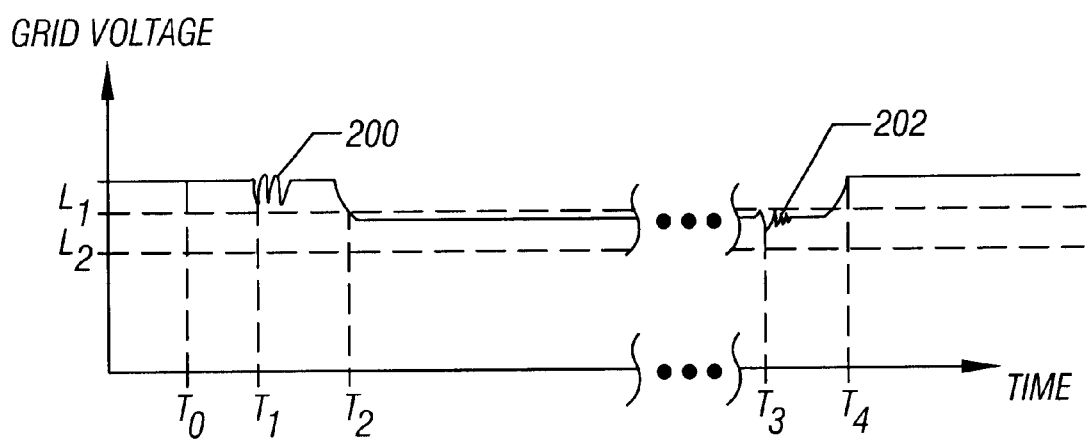
FIG. 5 depicts an exemplary waveform of a grid voltage of the system of FIG. 1 according to an embodiment of the invention.

FIG. 5 depicts an exemplary time profile of the grid voltage on the power grid 12. As shown, at time $T_0$, the grid voltage is above a minimum threshold voltage level (called $L_1$) that is used by the shut down detection scheme to detect grid shut down. At time $T_1$, the utility 6 communicates a signal 200 that indicates an impending decrease in the grid voltage, a decrease that occurs at time $T_2$. The decrease may be due to the total load on the power grid 12 approaching the total power that is being received by the power grid 12. Before the decrease occurs, the controller 60 lowers the minimum threshold voltage to a new level called $L_2$, and thus, the lowering of the grid voltage does not trigger a false detection of a grid shut down.

Also depicted in FIG. 5 is a subsequent increase in the grid voltage. In this manner, at time $T_3$, the utility 6 communicates a signal 202 indicating a pending increase in the grid voltage. In this manner, the total load on the power grid 12 may have significantly increased by time $T_3$, thereby permitting the utility 6 to increase the grid voltage. In response to the signal, the controller 60 raises the minimum threshold after the grid voltage rises to its new level at time $T_4$.

Referring back to FIG. 3, among the other features of the full cell system 10, the system 10 may include a cell voltage monitoring circuit 40 to measure the cell voltages of the fuel cell stack 20 and the $V_{TERM}$ stack voltage; and a current sensor 49 to measure a DC output current from the stack 20. The cell voltage monitoring circuit 40 communicates (via a serial bus 48, for example) indications of the measured cell voltages to the controller 60. The current sensor 49 is coupled in series with an output terminal 31 of the fuel cell stack 20 to provide an indication of the output current (via an electrical communication line 52).

The system 20 may include a voltage regulator 30 that regulates the $V_{TERM}$ stack voltage and converts this voltage into an AC voltage via an inverter 33. The output terminals 32 of the inverter 33 are coupled to the load 50. The fuel cell system 10 also includes control valves 44 that provide emergency shutoff of the oxidant and fuel flows to the fuel cell stack 20. The control valves 44 are coupled between inlet fuel 37 and oxidant 39 lines and the fuel and oxidant manifold inlets, respectively, to the fuel cell stack 20. The inlet fuel line 37 receives the fuel flow from the fuel processor 22, and the inlet oxidant line 39 receives the oxidant flow from the air blower 24. The fuel processor 22 receives a hydrocarbon (natural gas or propane, as examples) and converts this hydrocarbon into the fuel flow (a hydrogen flow, for example) that is provided to the fuel cell stack 20.

The fuel cell system 10 may include water separators, such as water separators 34 and 36, to recover water from the outlet and/or inlet fuel and oxidant ports of the stack 22. The water that is collected by the water separators 34 and 36 may be routed to a water tank (not shown) of a coolant subsystem 54 of the fuel cell system 10. The coolant subsystem 54 circulates a coolant (de-ionized water, for example) through the fuel cell stack 20 to regulate the operating temperature of the stack 20. The fuel cell system 10 may also include an oxidizer 38 to bum any fuel from the stack 22 that is not consumed in the fuel cell reactions.

For purposes of isolating the load from the fuel cell stack 20 during a shut down of the fuel cell system 10, the system 10 may include a switch 29 (a relay circuit, for example) that is coupled between the main output terminal 31 of the stack 20 and an input terminal of the current sensing element 49. The controller 60 may control the switch 29 via an electrical communication line 50.

In some embodiments of the invention, the controller 60 may include a microcontroller and/or a microprocessor to perform one or more of the techniques that are described herein when executing the program 65. For example, the controller 60 may include a microcontroller that includes a read only memory (ROM) that serves as the memory 63 and a storage medium to store instructions for the program 65. Other types of storage mediums may be used to store instructions of the program 65. Various analog and digital external pins of the microcontroller may be used to establish communication over the electrical communication lines 46, 51 and 52 and the serial bus 48. In other embodiments of the invention, a memory that is fabricated on a separate die from the microcontroller may be used as the memory 63 and store instructions for the program 65. Other variations are possible.

The fuel cell system 10 may include a battery 41 that is coupled to the output terminal of the fuel cell stack 20 to supplement the power that is provided by the stack 20 during a transient condition in which more power is demanded from the system 10 than is provided by the stack 20.

Other embodiments are within the scope of the following claims. For example, in some embodiments of the invention, the signal that is communicated from utility 6 to the fuel cell system 10 may instruct the fuel cell system 10 to increase, reduce or maintain its current operating condition. For example, before an impending decrease in the grid voltage, the utility 6 may instruct the fuel cell system 10 (and possibly other fuel cell systems and generators) to increase its power output for purposes of raising the grid voltage to the level present before the grid voltage decrease. As an example, if the fuel cell system 10 is currently operating to provide 3 kW of power to the power grid 12, the instruction from the utility 6 to raise its current operating condition may cause the fuel cell system 10 to raise its output power to 7 kW. It is possible that at the time of the requested increase in power output, the fuel cell stack 20 is supplying its maximum output power. However, the fuel cell system 10 may use the battery 41 to provide the additional power. When the power that is consumed from the grid 12 decreases to a lower level, the utility 6 may instruct the fuel cell system 10 to lower its power output.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   coupling a generator to a power grid to provide power to the power grid;
   using a scheme to detect a shut down of the power grid;
   preventing the generator from providing power to the power grid in response to the detection of the shut down of the power grid;
   receiving an indication to modify the scheme; and
   modifying the scheme based on the indication.

2. The method of claim 1, wherein the using the scheme comprises:
   comparing a voltage of the power grid to a predefined threshold; and
   indicating detection of the shut down of the power grid based on the determination.

3. The method of claim 2, wherein the indicating the detection comprises:
   indicating the detection of the shut down if the voltage is below the predefined threshold.

4. The method of claim 2, wherein the modifying the scheme comprises:
   changing the threshold based on the indication.

5. The method of claim 4, wherein the changing comprises:
   lowering the threshold based on the indication.

6. The method of claim 4, wherein the changing comprises:
   raising the threshold based on the indication.

7. The method of claim 1, further comprising:
   communicating the request to the power grid in response to an impending decrease in a voltage of the power grid.

8. The method of claim 1, wherein the generator comprises a fuel cell system.

9. The method of claim 8, wherein the preventing comprises:
   isolating a fuel cell stack from the power grid.

10. The method of claim 8, wherein the preventing comprises:
    shutting off a fuel flow to a fuel cell stack.

11. The method of claim 1, wherein the indication is received from the power grid.

12. The method of claim 1, wherein the indication is received from one of a telephone line and a wireless link.

13. A system comprising:
    a generator coupled to provide power to a power grid; and
    a circuit coupled to the generator and adapted to:
      use a scheme to detect a shut down of the power grid,
      prevent the generator from providing power to the power grid in response to the detection of the shut down of the power grid,
      receive an indication to modify the scheme, and
      modify the scheme based on the indication.

14. The system of claim 13, wherein the circuit is adapted to:
    compare a voltage of the power grid to a predefined threshold; and
    indicate detection of the shut down of the power grid based on the determination.

15. The system of claim 14, wherein the circuit is adapted to:
    indicate detection of the shut down if the voltage is below the predefined threshold.

16. The system of claim 14, wherein the circuit is adapted to change the threshold based on the indication.

17. The system of claim 16, wherein the circuit is adapted to lower the threshold based on the indication.

18. The system of claim 16, wherein the circuit is adapted to raise the threshold based on the indication.

19. The system of claim 13, wherein the request is communicated to the power grid in response to an impending decrease in a voltage of the power grid.

20. The system of claim 13, wherein the generator comprises a fuel cell stack to produce the power provided to the power grid.

21. The system of claim 20, further comprising:
    a switch to isolate the fuel cell stack from the power grid in response to the shut down of the power grid.

22. The system of claim 20, further comprising:
    a fuel processor to provide a fuel flow to the fuel cell stack.

23. The system of claim 13, wherein the circuit shuts off the fuel flow in response to the shut down of the power grid.

24. The system of claim 13, wherein the indication is received from the power grid.

25. The system of claim 13, wherein the indication is received from one of a telephone line and a wireless link.

* * * * *